(12) United States Patent
Dollard

(10) Patent No.: US 7,072,411 B1
(45) Date of Patent: Jul. 4, 2006

(54) COMPUTATION REDUCTION IN OFDM SYSTEM USING FREQUENCY DOMAIN PROCESSING

(75) Inventor: Michael Dollard, Brecksville, OH (US)

(73) Assignee: Cisco Technology, Inc., San Jose, CA (US)

( * ) Notice: Subject to any disclaimer, the term of this patent is extended or adjusted under 35 U.S.C. 154(b) by 1099 days.

(21) Appl. No.: 10/004,567

(22) Filed: Dec. 4, 2001

(51) Int. Cl.
*H04K 1/10* (2006.01)

(52) U.S. Cl. ...................... 375/260; 370/210

(58) Field of Classification Search ................ 375/219, 375/222, 260–261; 370/208, 210
See application file for complete search history.

(56) References Cited

U.S. PATENT DOCUMENTS

| | | | |
|---|---|---|---|
| 5,732,068 A | 3/1998 | Takahashi et al. | 370/206 |
| 5,774,450 A * | 6/1998 | Harada et al. | 370/206 |
| 6,594,320 B1 * | 7/2003 | Sayeed | 375/281 |
| 6,657,950 B1 * | 12/2003 | Jones et al. | 370/208 |
| 6,676,307 B1 * | 1/2004 | Yang et al. | 385/96 |
| 2002/0021715 A1 * | 2/2002 | Matheus et al. | 370/480 |
| 2002/0080887 A1 * | 6/2002 | Jeong et al. | 375/295 |

OTHER PUBLICATIONS

Bracewell, *The Fourier Transform and its Applications*, (2nd Ed. Revised 1986) at pp. 362-370.
Wu et al., "FIR Filter Design via Semidefinite Programming and Spectral Factorization", Stanford University.
Wu et al., "FIR Filter Design via Spectral Factorization and Convex Optimization", 1997, *Applied Computational Control, Signal and Communications*, Chap. 1.

* cited by examiner

*Primary Examiner*—Young T. Tse
(74) *Attorney, Agent, or Firm*—Dan Lang; Dov Rosenfeld; Inventek

(57) ABSTRACT

Improved systems and methods for implementing Orthogonal Frequency Division Multiplexing (OFDM) systems and for computing Fast Fourier Transforms (FET) having strictly real outputs are provided. Systems and methods are provided for efficiently implementing an Inverse Fast Fourier Transform (IFFT) with complex inputs and real outputs. Filtering and upconversion are performed in the frequency domain to simplify digital time domain processing and generally reduce complexity.

20 Claims, 4 Drawing Sheets

COMPUTATION REDUCTION IN OFDM SYSTEM USING FREQUENCY DOMAIN PROCESSING

BACKGROUND OF THE INVENTION

The present invention relates to digital communication systems and more particularly to systems and methods for simplifying the implementation of Orthogonal Frequency Division Multiplexing (OFDM) transmitters and receivers. The present invention also generally relates to computation of transforms such as the Fast Fourier Transform (FFT) and the Inverse Fast Fourier Transform (IFFT).

Wireless communications represent a highly useful alternative and supplement to wired services. Wireless offers access to untethered devices and thus addresses the reality that the modern worker often does not operately solely at a fixed workstation but rather moves frequently from location to location throughout the day. The remote location may be a conference room near the employee's desk, a client location across town, an airport, or a hotel room in another city or country.

Furthermore, for both office and home environments, even where computing devices have fixed locations, it may nonetheless be difficult or expensive to extend network access with the desired bandwidth everywhere as desired. The owners of older homes do not wish to incur the expense of rewriting for modern network technologies. As business grow and evolve, the demand for network connections may not correspond well to previously established wiring patterns.

Wireless communication is also highly useful in providing broadband Internet access to business and residences. A significant fraction of business and residences cannot get broadband Internet access through either Digital Subscriber Line (DSL) technology or cable modems. Wireless communications allows for broadband Internet access to be provided to these locations without the need to construct a new wired infrastructure.

As data rates increase to accommodate enhanced data communication services, multipath transmission effects becomes an obstacle to effective use of radio techniques for wireless communications. Within the most useful portions of the spectrum, a wireless signal will take two or more paths between the transmitter and the receiver due to reflections caused by terrain, foliage, buildings, indoor walls, etc. Because the paths are not the same length, there will be a difference in arrival times and the received wireless signal will interfere with time-shifted versions of itself. A further complication then arises because at particularly high data rates the self-interference will be between different data symbols transmitted at different times.

Orthogonal frequency division multiplexing (OFDM) is a highly powerful modulation technique that addresses the problems posed by multipath interference. To accomplish this, OFDM divides the available spectrum into many low data rate, narrow sub-channels that are transmitted in parallel. Since each sub-channel has a much lower data rate compared to the overall data rate the immunity to multipath is improved. At the same time interference between each sub-channel is eliminated by ensuring that the carrier frequency of each sub-channel is orthogonal to every other sub-channel. This is achieved by selecting sub-carriers to be a "frequency bin" used within an Inverse Fast Fourier Transform (IFFT). Incoming data is mapped to a constellation point for each sub-carrier or "frequency bin". The IFFT is then used to convert the frequency domain OFDM symbol into N time domain samples where N is the size of the IFFT that was used.

A guard interval or cyclic prefix is added to complete an OFDM symbol (or block). The cyclic prefix is used to prevent inter-symbol interference and maintain the orthogonality between each OFDM symbol. The cyclic prefix is usually selected to be at least as long as the duration of the impulse response of the channel. It is created by copying the last L-samples of the time domain signal and appending this to the beginning of the OFDM block. A set of subchannel values are input to the IFFT procedure within the transmitter and recovered by use of an FFT at the receiver. These subchannel values are complex values that are chosen from a constellation of points to communicate data. The more points there are in the constellation, the more bits of data that may be sent in each sub-channel per OFDM symbol time.

The complex samples that are output by the IFFT are used to define the amplitude and phase of the real sinusoidal, composite signal carried over the airwaves. In the simplest approach, the real and imaginary components of the IFFT output samples are separately converted from digital form to analog form. For each time domain sample, the real value of the symbol defines the amplitude of an in-phase "I" component of the modulated signal while the imaginary value defines the amplitude of a quadrature "Q" component that is 90 degrees phase shifted from the "I" component. For high data rate systems, a relatively dense constellation is used on each sub-carrier and it is absolutely critical that the I and Q components are scaled identically at each stage of processing within both the transmitter and the receiver. Any imbalance between the I and Q channels will lead to distortion and performance degradation.

Because it is difficult to achieve perfect balance between the I and Q channels using analog circuits an alternative approach has emerged. In this approach, the digital baseband samples are interpolated to a higher sampling frequency, filtered to remove images and then upconverted to an Intermediate Frequency (IF). All this is done in the digital domain, not the analog domain, and thereby eliminates the variations associated with analog circuits. The digital signal is then converted to a passband analog signal using a Digital Analog Converter (DAC). This results in an oversampled analog signal centered at the selected IF. Since the result of this digital up conversion is a real passband signal, this process obviates the need for precisely balanced analog processing of separate I and Q channels and eliminates the need for two DACs. A similar approach is taken at the receiver where a passband signal is digitized at a low IF using an Analog to Digital Converter (ADC). This signal is then down converted to baseband and processed by a digital decimation filter to remove adjacent channel signals and reduce the sampling rate.

Problems arise, however, in the digital implementation of this prior art approach. In order to sufficiently separate sampling images and adjacent channel signals from the desired signal, long and computational intensive digital filters are required. This leads to higher power consumption, increased gate count, and more expensive demodulation hardware for the system as a whole.

What is needed are systems and methods for improving OFDM implementation in the areas of, e.g., power consumption, communications performance, and computational complexity.

SUMMARY OF THE INVENTION

Improved systems and methods for implementing Orthogonal Frequency Division Multiplexing (OFDM) systems and for computing Fast Fourier Transforms (FFT) having strictly real outputs are provided by virtue of one embodiment of the present invention. Systems and methods are provided for efficiently implementing an Inverse Fast Fourier Transform (IFFT) with complex inputs and real outputs. Filtering and upconversion are performed in the frequency domain to simplify digital time domain processing and generally reduce complexity.

A first aspect of the present invention provides apparatus for transmitting an OFDM signal. The apparatus includes: a transform block that converts a group of subcarriers of an OFDM symbol to time domain samples and a frequency domain mapping block that assigns modulated subcarriers of the group to subchannels of the OFDM symbol so that the transform block outputs a time domain digital signal positioned at an IF.

A second aspect of the present invention provides apparatus for receiving an OFDM signal. The apparatus includes: a transform block that converts time domain samples to a frequency domain OFDM symbol, and a frequency domain symbol processing block that selects subcarriers of the frequency domain OFDM symbol centered at an IF as baseband frequency domain symbols thereby frequency shifting the selected subcarriers to baseband.

A third aspect of the present invention provides a method for transmitting an OFDM signal. The method includes: assigning subcarriers to subchannels centered around an IF within an OFDM frequency domain symbol to implement a frequency shift to that IF, converting the frequency domain OFDM symbol to time domain samples, and transmitting a signal based on the time domain samples.

A fourth aspect of the present invention provides a method of using an N/2-point transform to transform a N-point complex-valued series to an N-point real-valued series. The method includes: mapping the N-point complex-valued series to a first N/2-point complex-valued series using a first mapping function, performing an inverse discrete Fourier transform, e.g., inverse fast Fourier transform on the first N/2-point complex-valued series to obtain a second N/2-point complex-valued series, and mapping real and imaginary components of the second N/2-point complex-valued series to the N-point real-valued series using a second mapping function.

A fifth aspect of the present invention provides a method for receiving an OFDM signal. The method includes: converting samples to a frequency domain OFDM symbol using a transform, and selecting subcarriers from the frequency domain OFDM symbol to effect a frequency shift from an IF to baseband.

Further understanding of the nature and advantages of the invention herein may be realized by reference to the remaining portions of the specification and the attached drawings

DESCRIPTION OF SPECIFIC EMBODIMENTS

One application of the present invention is a wireless communication system that employs orthogonal frequency division multiplexing (OFDM). For example, wireless local area networks may operate in accordance with the IEEE 802.11(a) standard as described in IEEE Std 802.11a-1999, Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications, High-Speed Physical Layer in the 5 GHz Band, IEEE Standard Association 1999, the contents of which are incorporated herein by reference in their entirety for all purposes.

The present invention, however, may also be applied to other types of wireless systems such as wireless local area networks using other OFDM-based standards, wireless systems being used for metropolitan area network access, mobile wireless communications, etc. Also, the present invention is not limited to wireless communication systems but will also find application in, e.g., systems such as cable modem networks, DSL links, etc.

Figure 1:
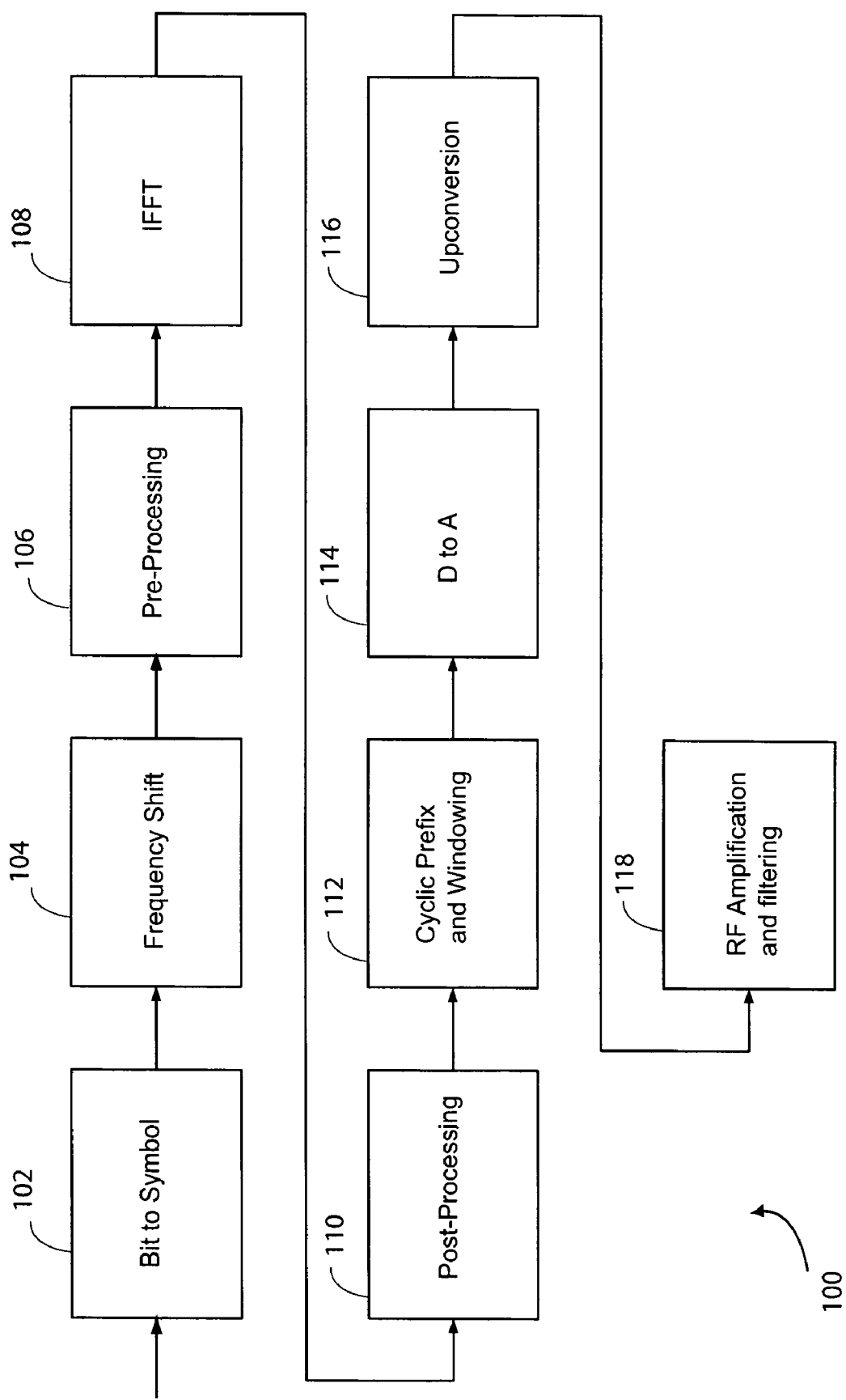
FIG. 1 depicts elements of an OFDM transmitter according to one embodiment of the present invention.

FIG. 1 depicts an OFDM transmitter 100 according to one embodiment of the present invention. For ease of explanation, certain elements unrelated to operation of the present invention are omitted. A bit to sub-carrier symbol block 102 accepts as input data to be transmitted and maps groups of one or more bits to sub-carrier symbols according to the operative symbol constellation. The constellation that is employed depends on the operative modulation scheme, e.g., QPSK, 16-QAM, 64-QAM, etc. The present invention may be particularly advantageous when used in conjunction with higher-order modulation schemes such as 64-QAM, etc., where each sub-carrier conveys a relatively large amount of information but at the expense of tolerance to noise, interference, and/or distortion. Also due to channel conditions, each sub-carrier may use a different constellation.

To increase the robustness of communications, other signal processing techniques such as Forward Error Correction (FEC), interleaving, etc., may be applied to the bits input to block 102 and/or the symbols output by block 102. The output of block 102 is therefore a sequence of complex values. To facilitate OFDM processing, the symbols are assigned to subchannels within an OFDM symbol.

In an 802.11(a) system, each OFDM symbol consists of 64 frequency domain subcarriers. Of these 64 subcarriers, 52 subcarriers would originate from block 102 while other subcarriers are preassigned a value of zero. According to one embodiment of the present invention, however, 256 subcarriers are assigned from block 102. Only 52 subcarriers carry data while all others are set to zero. This maintains the bandwidth of the signal while effectively upsampling and filtering it.

Figure 3A:
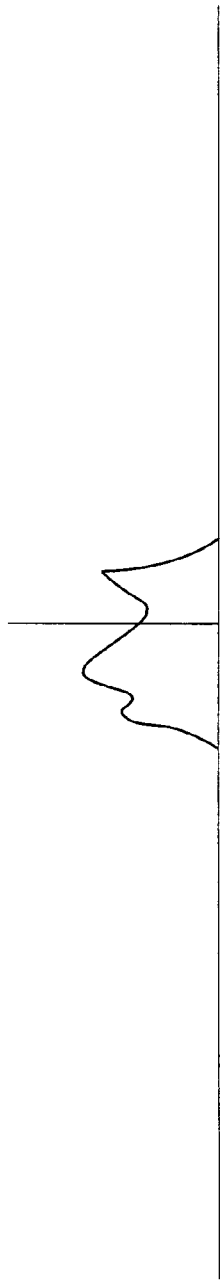
FIGS. 3A–3C depict signal spectrum useful in describing one embodiment of the present invention.

FIG. 3A depicts the spectrum of the 64 frequency domain subcarriers specified by 802.11(a) including the 52 data-carrying subcarriers that would be output by bit to symbol block 102 in the example scheme being described. The centerline represents DC in the frequency domain as baseband. A frequency shift block 104 positions the 64 subcarrier side spectrum of FIG. 3A within a 256 subcarrier wide spectrum. The 64 subcarrier wide spectrum of FIG. 3A is centered on a frequency domain subchannel that corresponds to a desired IF. In the depicted example, the spectrum is now centered approximately 32 subcarriers above DC. Since a real spectrum is desired as an output, a mirror image and complex conjugate of the spectrum is copied to the negative frequencies. Thus, a relationship of $R(x)=R^*(-x)$ is maintained between all the positive and negative frequency subcarriers. This process effectively performed a time domain interpolation, filtering and quadrature upconversion all in the frequency domain. This eliminates all the computational intensive multiplications and additions associated with time domain interpolation, filtering and upconversion.

However, according to one embodiment of the present invention, a further reduction in the computational burden of implementing the OFDM system may be obtained by pre-processing of the subcarrier values input to the IFFT and post-processing of time domain samples provided by the IFFT output. This reduced computation technique exploits the knowledge than the input to the IFFT is symmetrical about 0 such that $X(p)=X^*(-p)$ where $X^*$ is the complex conjugate. This restriction then implies that the output of the IFFT will result in only real values in the time domain after the complex values are mapped to real values. In the current example, a 128-point IFFT may be used instead on a 256-point IFFT by performing this pre-processing and post-processing.

The input to a pre-processing block 106 is, in this example, a series of 256 complex points where the real values are an even function (i.e. $X_r(p)=X_r(-p)$) and the imaginary values are an odd function (i.e. $X_i(p)=-X_i(-p)$). Since all 256 points can be defined using only 128 points due to the previously noted restrictions, the negative 128 points can be dropped. The positive 128 complex points are used as the input to the following mapping function:

$$R(A)=[X_r(A)-X_r(B)]*\sin A+[X_i(A)+X_i(B)]*\cos A-X_r(A)-X_r(B)$$

$$R(B)=[X_r(B)-X_r(A)]*\sin A+[X_i(A)+X_i(B)]*\cos A-X_r(A)-X_r(B)$$

$$I(A)=[X_i(B)+X_i(A)]*\sin A+[X_r(B)-X_r(A)]*\cos A-X_i(A)+X_i(B)$$

$$I(B)=[X_i(B)+X_i(A)]*\sin A+[X_r(B)-X_r(A)]*\cos A+X_i(A)-X_i(B)$$

where A+B=128, R(m) is a real component of an mth point of the 128-point complex-valued series output by block 106 and I(m) is the imaginary component of this mth point. An IFFT block 108 performs a 128-point IFFT on each 128-point complex-valued series output by block 106. Various IFFT algorithms may be used to implement block 108 such as a 128 point, radix-2 algorithm as known in the art. It has been found that, although compared to a prior art system employing 64 subcarrier wide OFDM symbols, the longer length IFFT plus the additional frequency domain processing is overall computationally less demanding than the equivalent time domain processing using digital filtering techniques and a shorter IFFT length.

The resulting 128 complex time domain samples from the IFFT are post-processed using block 110. This block maps the 128 complex values to 256 real values by using the mapping function.

$$x(2k)=y_r(k)$$

$$x(2k+1)=y_i(k)$$

where x(p) is a strictly real value of a pth domain sample of the 256 sample output burst of block 110. Also, $y_r(k)$ is a real part of the kth time domain sample of the burst output by block 108 and $y_i(k)$ is the imaginary part of the kth sample.

Accordingly, the output of block 110 is a series of 256 samples representing an OFDM symbol where the time domain samples have only real values. Block 112 then appends the cyclic prefix to the OFDM symbol by copying the last L samples from the end of the block and appending it to the begin of the block to create the OFDM symbol of length N+L. To provide optimal robustness against multipath interference, the length, L, of the cyclic prefix should be at least as long as the communication channel impulse response. To help smooth the transition between OFDM symbols and control the sidelobe spectrum, a windowing function may be applied. The window is generally a symmetrical function centered amount (N+L)/2. Most of the values are set to one in the middle of the function while the values at the beginning and end taper off to zero to smooth the transition between OFDM symbols. Various functions can be used for windowing such as, e.g., Raised Cosine, Hamming windows, etc.

A digital to analog converter 114 then converts the digital time sample output by block 112 to analog form. In this particular embodiment the output signal is then sampled at 80 MHz and is centered at an IF frequency of 20 MHz. This signal is then low pass filtered to remove the alias signals from the DAC. An upconversion block 116 mixes the analog IF signal with a local oscillator signal to form the RF signal. An RF amplification and filtering block 118 provides necessary RF filtering as well as amplification to a desired transmission power. The output of block 118 is coupled to an antenna.

Figure 2:
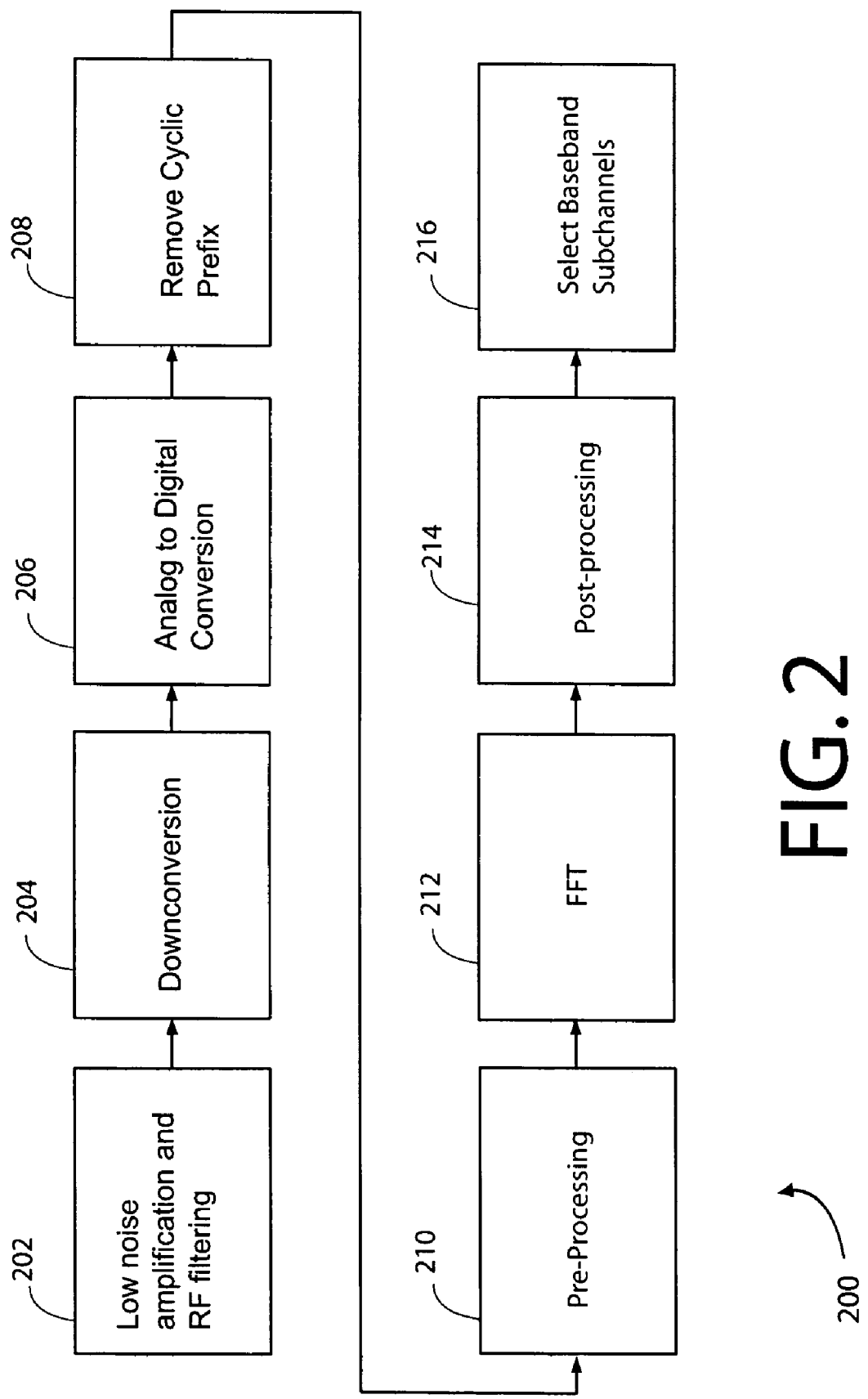
FIG. 2 depicts elements of an OFDM receiver according to one embodiment of the present invention.

FIG. 2 depicts elements of an OFDM receiver 200 according to one embodiment of the present invention. The OFDM receiver depicted in FIG. 2 is intended to process and modulate the signals received from a transmission such as the one depicted in FIG. 1. An RF signal obtained from an antenna is input to an RF block 202 that provides low noise amplification and RF filtering. A downconversion block 204 mixes the RF output of block 202 with a local oscillator signal to develop a received IF signal. Block 204 may also provide IF filtering to remove undesired images caused by the mixing process. An analog to digital conversion block 206 then converts the analog IF signal to a series of digital samples. In one embodiment, the sampling frequency of block 206 is 80 MHz with the signal centered and around 20 MHz.

The output of block 206 is a series of N+L samples which represents an OFDM symbol. In this embodiment the OFDM symbol contains N=256 data carrying samples and L=64 samples of the cyclic prefix. The cyclic prefix removed block 208 removes the cyclic prefix from each burst. At this point the time domain samples are still real-valued and centered at an IF frequency. Thus there is an opportunity to economize on receiver FFT processing even though the FFT output will themselves typically have complex values. A pre-processing block 210 maps the 256 real-valued samples of each OFDM symbol to 128 complex values. Pre-processing block 210 applies the following mapping function:

$$h(k)=z(2k)$$

$$g(k)=z(2k+1)$$

$$y(k)=h(k)+jg(k)$$

$$k=0, 1, 2, \ldots 127$$

where z(k) is the real value of the kth time domain sample of the OFDM symbol and y(k) is the complex value of the kth sample made from z(k) which is used as input to the FFT processor, block 212.

An FFT block 212 then performs a 128-pound FFT on the time domain samples of each OFDM symbol output by block 210. FFT block 212 may employ, e.g., a 128 point, radix-2, FFT algorithm as known in the art. The output of block 212 is a series of frequency domain OFDM symbols including values for each subcarrier. A post-processing block 214 then corrects the output of the FFT to get the 128 positive frequency bins. Block 214 applies the following correction function.

$$X_r(n) = \left[\frac{R(n)}{2} + \frac{R(N-n)}{2}\right] + \cos\left(\frac{\pi n}{N}\right)\left[\frac{I(n)}{2} + \frac{I(N-n)}{2}\right] - \sin\left(\frac{\pi n}{N}\right)\left[\frac{R(n)}{2} - \frac{R(N-n)}{2}\right]$$

$$X_i(n) = \left[\frac{I(n)}{2} + \frac{R(N-n)}{2}\right] - \sin\left(\frac{\pi n}{N}\right)\left[\frac{I(n)}{2} + \frac{I(N-n)}{2}\right] - \cos\left(\frac{\pi n}{N}\right)\left[\frac{R(n)}{2} - \frac{R(N-n)}{2}\right]$$

$$n = 0, 1, \ldots, N-1$$

Figure 3B:
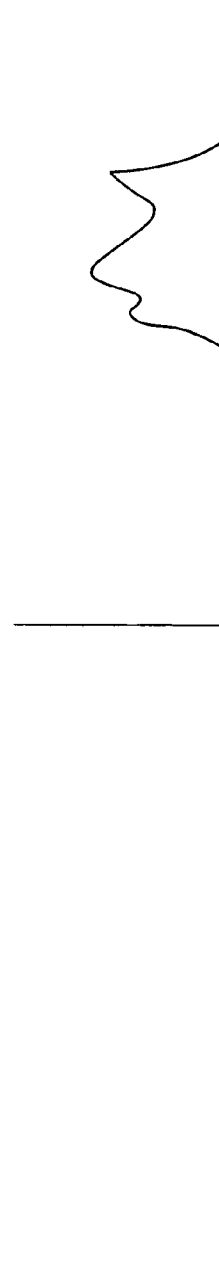
Figure 3C:

The above mapping provides the values of $X_r(n)$ and $X_i(n)$ for n between 0 and 127 where $X_r(n)$ and $X_i(n)$ are the real and imaginary values for positive frequency bin n and R(N)=R(O) and I(N)=I(O). The values for the negative frequencies are easily obtained from $X_r(n)$ and $X_i(n)$ by taking the complex conjugate to the corresponding positive frequency bin; that is X(n)=X*(−n). This is true since the input to the FFT was a real valued signal in the time domain and therefore has an even function for the real values and an odd function for the imaginary values in the frequency domain. Since we are only interested in the positive frequency values, the outputs of block 214 and 128 sub-carriers or an oversampled OFDM symbol which is shifted in the frequency domain as show in FIG. 3B so as to be centered at the IF. FIG. 3C shows a representation of the complete frequency domain, with the values at the negative frequencies being the complex conjugate of the values at the corresponding positive frequencies.

A block 216 implements a shift to baseband by simply setting the group of 52 subchannels centered at the IF and ignoring the remaining subchannels. This selection represents a simple implementation of all the necessary digital filtering and downconversion from IF to baseband. Further processing (not shown) is then used for deinterleaving, error correction decoding, etc.

Figure 4:
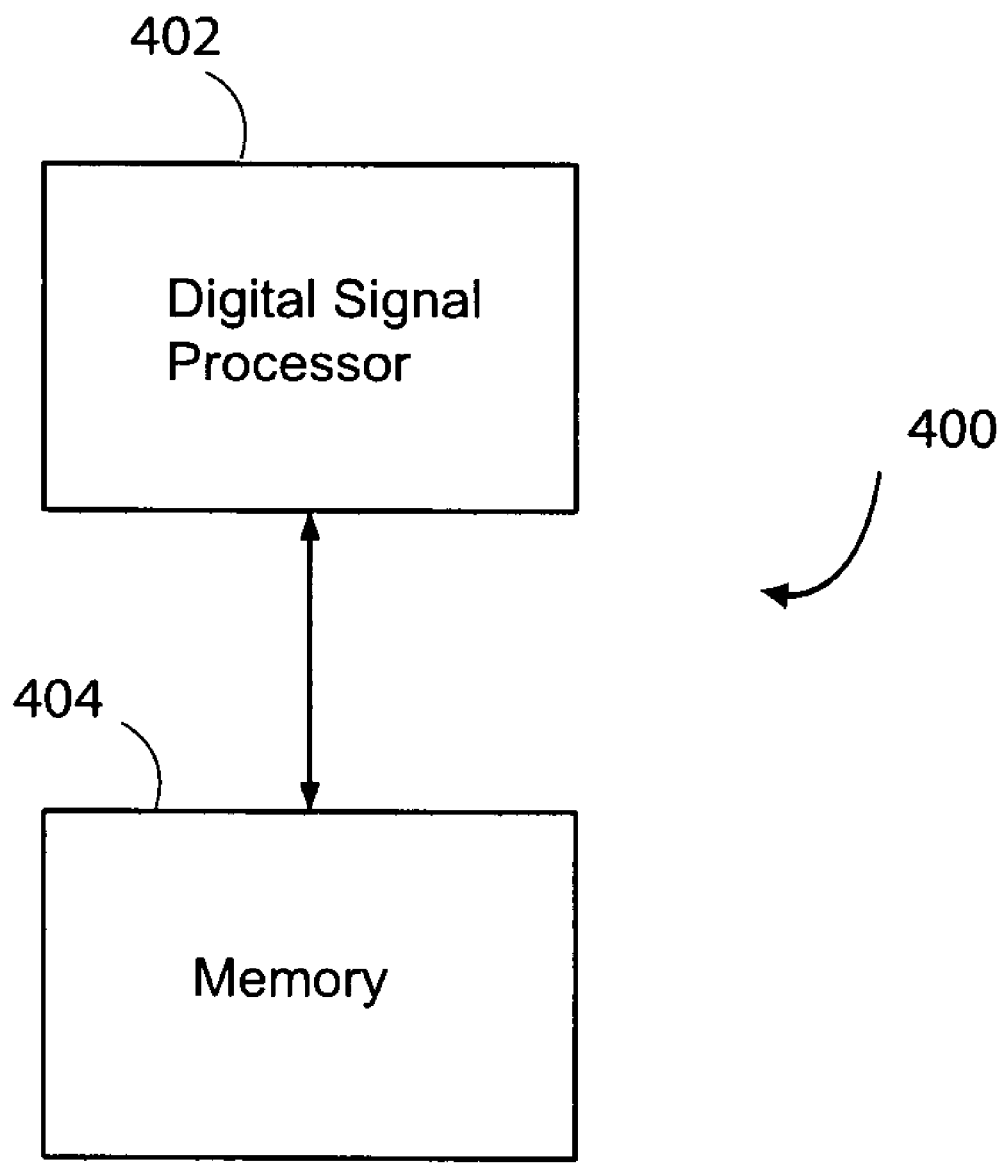
FIG. 4 depicts elements useful in implementing one embodiment of the present invention.

In one embodiment, custom logic is used to implement an OFDM system according to the present invention. Alternatively, a digital signal process may be used to implement all or part of the OFDM system. FIG. 4 depicts a representative system 400 that may be used to implement the present invention including both the transmitter of FIG. 1 and the receiver of FIG. 2. A digital signal processor 402 is capable of executing conventional mathematical floating point operations as well as specialized operations such as the FFT and IFFT. The operation of digital signal processor 402 is controlled by software stored in a memory device 404. The memory device 404 may be, e.g., a Read Only Memory (ROM) storing instructions for processor 402. Memory device 404 may be, e.g., a Random Access Memory (RAM) providing temporary storage of such instructions. Alternatively, memory device 404 may be any other memory device or combination of memory devices.

Memory 404 is but one example of a computer-readable storage medium that stores instructions for execution by a processor such as processor 402. For example, instructions for implementing the digital portions of processing according to the present invention may be stored on a floppy disk, CD-ROM, DVD-ROM, or any computer-readable storage medium. Another example of obtaining instructions from a computer-readable storage medium is loading the instructions from a network.

Memory and processing may be, e.g., integrated on one device or divided among many devices. Digital processing according to the present invention may also be implemented by e.g., a general-purpose microprocessor, a field programmable gate array (FPGA), an application-specific integrated circuit (ASIC), etc.

It will be seen that the present invention provides a great simplification in the implementation of OFDM transmitters and receivers. Thus, the advantages of OFDM techniques in handling challenging wireless communication environments can now be brought to lower cost devices having lower power consumption. For portable devices this directly leads to an increase in battery life.

An analysis of the savings for a particular receiver architecture is outline as follows and a similar analysis can be used for a transmitter architecture. For this example, it is assumed that an OFDM signal using 52 subcarriers is used. This implies that a 64-point FFT would be used to generate the OFDM symbols. In addition, a 16-sample guard interval is assumed resulting in an OFDM symbol length of 80 samples. A received signal is oversampled by a factor of 4, so the decimation rate is 4.

Using one prior art approach, a passband signal at a low IF is sampled, digitally downconverted in quadrature (i.e. real signal in with a complex baseband signal out), filtered, decimated and corrected for frequency errors before the FFT block. The filter is assumed to be a 32 tap FIR filter for both the real and imaginary signal paths. The computational complexity is computed for a single OFDM symbol using this prior art approach is as follows. The computational complexity for the digital quadrature downconversion is assumed to be zero if the IF frequency is ¼ the sampling frequency because the quadrature downconversion simplifies to multiplication by +1,+j,−1 and −j. The filter and decimation steps require 32 multiplication and additions per sample.

There are 320 samples per OFDM symbol at the oversampled rate. However, only 1 out of every 4 samples are used due to decimation. In addition, if symmetric FIR coefficients are used the number of multiplications can be reduced in half. This results in 320*32*2/(4*2)=2560 multiplications and 2*320*32/4=5120 additions. The frequency shifter is a complex multiplier which requires 4 multiplications and 2 additions per sample. This results in 4*80=320 multiplications and 2*80=160 additions per symbol. A 64 point, radix-2 FFT requires 512 multiplications and 1024 additions. The total computational complexity for this prior art approach is therefore 2560+320+512+3392 multiplications and 5120+160+1024=6304 additions.

Using a technique according to one embodiment of the present invention, the input passband signal an IF is sampled, frequency corrected, Fast Fourier transformed using a 128 point FFT, and unmapped to obtain the subcarrier information. The frequency correction is applied to 4× oversampled, real input samples. Since the OFDM symbol is 80 samples long, the oversampled symbol length is 40*80=320 samples long. The frequency correction therefore requires 320 multiplications. The radix-2, 128 point FFT requires 1280 multiplications and 2432 additions.

Finally, to unmap the subcarriers from the FFT output requires 4 multiplications and 8 additions per subcarrier. However, only 52 of the subcarriers are of interest. Therefore, the required arithmetic operations for the unmapping are 52*=208 multiplications and 52*8=416 additions. So the total required arithmetic operations are 320+1280+208=1808 multiplications and 2432+416=2848 additions. The results of these two approaches and the savings provided by one embodiment of the present invention are summarized in the table below:

| Functional Block | Prior Art # Mult. | Prior Art # Add | Frequency Domain Processing # Mult | Frequency Domain Processing # Add | % Savings # Mult | % Savings # Add |
|---|---|---|---|---|---|---|
| Downconversion | 0 | 0 | 0 | 0 | | |
| 32 Tap FIR | 2560 | 5120 | 0 | 0 | | |
| Frequency Correction | 320 | 160 | 320 | 0 | | |
| FFT | 512 | 1024 | 1280 | 2432 | | |
| Unmapping | 0 | 0 | 208 | 416 | | |
| Total | 3392 | 6304 | 1808 | 2848 | 47% | 55% |

It is understood that the examples and embodiments that are described herein are for illustrative purposes only and that various modifications are changes in light thereof will be suggested to persons skilled in the art and are to be included within the spirit and purview of this application and scope of the appended claims and their full scope of equivalents.

The invention claimed is:

1. An apparatus for transmitting an OFDM signal, said apparatus comprising:
a transform block that converts a group of subcarriers of an OFDM symbol to a set of time domain samples of said OFDM symbol to form a time domain burst; and
a frequency domain mapping block that assigns modulated subcarriers of said group to subchannels of said OFDM symbol so that said transform block outputs a time domain digital signal positioned at an intermediate frequency (IF), and that adjusts values of subcarriers of said group of subcarriers so that said samples of said OFDM symbol have strictly real values,
such that there are a total of N values for N positive and negative frequency subchannels to be converted to a set of real-valued time domain samples,
wherein the transform block includes a preprocessor to map the N values to a first N/2-point complex-valued series using a first mapping function, an n/2-point transformer to perform an inverse discrete Fourier transform on said first N/2-point complex-valued series to obtain a second N/2-point complex-valued series; and a postprocessor to map real and imaginary components of said second N/2-point complex-valued series to the set of real-valued time domain samples using a second mapping function.

2. The apparatus of claim 1 further comprising a cyclic prefix block that adds a cyclic prefix to said time domain burst.

3. The apparatus of claim 2 further comprising:
a digital to analog converter that generates an analog signal derived from an output of said transform block without time domain digital filtering.

4. An apparatus for receiving an OFDM signal, said apparatus comprising:
a cyclic prefix removal block to remove a cyclic prefix from samples of a received time domain OFDM signal to provide a series of N received time domain samples;
a transform block that converts the series of N received time domain samples to a frequency domain OFDM symbol comprising a set of complex values subcarriers; and
a frequency domain symbol processing block that selects subcarriers of said frequency domain OFDM symbol centered to an intermediate frequency (IF) as a baseband frequency domain symbols, thereby frequency shifting said selected subcarriers to baseband,
wherein the series of N received time domain samples are real-valued, and wherein the transform block includes a preprocessor to map the series of N received time domain samples to a first N/2-point series of values using a first mapping function, a transformer to perform an FFT on said first N/2-point series at values to obtain a second N/2-point series of values; and a postprocessor to map the second N/2-point series of values to a total of N real and imaginary valued subcarriers at a corresponding set of N frequency subchannels, including the selected subcarriers to be shifted to baseband, the postprocessor using a second mapping function.

5. The apparatus of claim 4 further comprising:
an analog to digital converter that converts an IF analog signal to provide said time domain samples without time domain digital filtering.

6. The apparatus of claim 5 wherein said analog to digital converter oversamples said analog signal.

7. A method for transmitting an OFDM signal, said method comprising:
assigning subcarriers to subchannels centered around an intermediate frequency (IF) within a frequency domain OFDM symbol to implement a frequency shift to that IF such that there are a total of N values for N positive and negative frequency subchannels;
converting said N values for N subchannels on the frequency domain OFDM symbol to real-valued time domain samples; the step of converting including:
mapping the N values to a first N/2-point complex-valued using a first mapping function;
performing an N/2-point inverse discrete Fourier transform on said first N/2-point complex-valued series to obtain a second N/2-point complex-valued series; and
mapping real and imaginary components of said second N/2-point complex-valued series to a set of real-valued time domain samples using a second mapping function; and transmitting a signal based on said real-valued time domain samples.

8. The method of claim 7 further comprising:
generating an analog signal based on said real-valued time domain samples without time domain digital filtering.

9. A method of using an N/2-point transform to transform an N-point complex-valued series to an N-point real-valued series, said method comprising:

mapping said N-point complex-valued series to a first N/2-point complex-valued series using a first mapping function;

performing an inverse discrete Fourier transform on said first N/2-point complex-valued series to obtain a second N/2-point complex-valued series; and mapping real and imaginary components of said second N/2-point complex-valued series to said N-point real-valued series using a second mapping function.

10. The method of claim 9 wherein said first mapping function comprises:

$$R(A)=[X_r(A)-X_r(B)]*\sin A+[X_i(A)+X_i(B)]*\cos A-X_r(A)-X_r(B)$$

$$R(B)=[X_r(B)-X_r(A)]*\sin A-[X_i(A)+X_i(B)]*\cos A-X_r(A)-X_r(B)$$

$$I(A)=[X_i(B)+X_i(A)]*\sin A+[X_r(B)-X_r(A)]*\cos A-X_i(A)+X_i(B)$$

$$I(B)=[X_i(B)+X_i(A)]*\sin A+[X_r(B)-X_r(A)]*\cos A+X_i(A)-X_i(B)$$

wherein A+B=N, R(m) is a real component of an mth point of said first N/2-point complex-valued series, i(m) is an imaginary component of said mth point; $X_r(p)$ is a real component of a pth point of said N-point complex-valued series, and $X_i(p)$ is an imaginary component of said pth point.

11. The method of claim 9 wherein said second mapping function comprises:

$x(2k)=y_r(k)$, $x(2k+1)=y_i(k)$ wherein x(p) is a real-only value of a pth component of said N-point real-valued series, $y_r(k)$ is a real component of a kth complete point of said second N/2-point complex-valued series, and $y_i(k)$ is an imaginary component of said kth complex point.

12. A method for receiving an OFDM signal, said method comprising:

converting a series of N real-valued time domain samples of a received OFDM signal to a frequency domain OFDM symbol using an N/2-point transformer, including:

mapping the series of N real-valued time domain samples to a first N/2-point series of values using a first mapping function;

transforming the first N/2-point series of values using the N/2-point transformer to perform an FFT on said first N/2-point series of values to obtain a second N/2-point series of values; and mapping the second N/2-point series of values to a total of N real and imaginary valued subcarriers at a corresponding set of N frequency subchannels using a second mapping function; and selecting subcarriers from said frequency domain OFDM symbol to effect a frequency shift from an intermediate frequency (IF) to baseband.

13. The method of claim 12 further comprising:

converting an IF analog signal to a digital signal used to generate said real-valued time domain samples without time domain digital filtering.

14. The method of claim 13 wherein converting comprises oversampling said IF analog signal.

15. An apparatus for transmitting an OFDM signal, said apparatus comprising:

means for assigning subcarriers to subchannels centered around an intermediate frequency (IF) within a frequency domain OFDM symbol to implement a frequency shift to that IF such that there are a total of N values for N positive and negative frequency subchannels;

means for converting said N values for N subchannels of the frequency domain OFDM symbol to real-valued time domain samples; the means for converting including:

means for mapping the N values to a first N/2-point complex-valued series using a first mapping function;

means for performing an N/2-point inverse discrete Fourier transform on said first N/2-point complex-valued series to obtain a second N/2-point complex-valued series; and means for mapping real and imaginary components of said second N/2-point complex-valued series to a set of real-valued time domain samples using a second mapping function; and means for transmitting a signal based on said real-valued time domain samples.

16. An apparatus for receiving an OFDM signal, said apparatus comprising:

means for converting a series of N real-valued time domain samples of a received OFDM signal to a frequency domain OFDM symbol using an N/2-point transformer, the means for converting including:

first mapping means for mapping the series of N real-valued time domain samples to a first N/2-point series of values using a first mapping function;

means for transforming the first N/2-point series of values using the N/2-point transformer to perform an FFT on said first N/2-point series of values to obtain a second N/2-point series of values; and second means for mapping the second N/2-point series of values to a total of N real and imaginary valued subcarriers at a corresponding set of N frequency subchannels using a second mapping function; and means for selecting subcarriers from said frequency domain OFDM symbol to effect a frequency shift from an intermediate frequency (IF) to baseband.

17. A computer program product for transmitting an OFDM signal, said computer program product comprising:

code that assigns subcarriers to subchannels centered around an intermediate frequency (IF) within a frequency domain OFDM symbol to implement a frequency shift to that IF such that there are a total of N values for N positive and negative frequency subchannels;

code that converts said N values for N subchannels of the frequency domain OFDM symbol to real-valued time domain samples, including code for:

mapping the N values to a first N/2-point complex-valued series using a first mapping function;

performing an N/2-point inverse discrete Fourier transform on said first N/2-point complex-valued series to obtain a second N/2-point complex-valued series; and mapping real and imaginary components of said second N/2-point complex-valued series to a set of real-valued time domain samples using a second mapping function code that causes a transmitter to transmit a signal based on said real-valued time domain samples; and a computer-readable storage medium that stores the codes.

18. A computer program product for using an N/2-point to transform N-point complex-valued series to an N-point real-valued series, said computer program product comprising:

code that maps said N-point complex-valued series to a first N/2-point complex-valued series using a first mapping function;

code that performs an inverse fast Fourier transform on said first N/2-point complex-valued series to obtain a second N/2-point complex-valued series;

code that maps real and imaginary components of said second N/2-point complex-valued series to the N-point complex valued series using a second mapping function; and a computer readable storage medium that stores the codes.

19. The computer program product of claim 18 wherein said first mapping function comprises:

$R(A)=[X_r(A)-X_r(B)]*\sin A+[X_i(A)+X_i(B)]*\cos A-X_r(A)-X_r(B)$ $R(B)=[X_r(B)-X_r(A)]*\sin A-[X_i(A)+X_i(B)]*\cos A-X_r(A)-X_r(B)$ $I(A)=[X_i(B)+X_i(A)]*\sin A+[X_r(B)-X_r(A)]*\cos A-X_i(A)+X_i(B)$ $I(B)=[X_i(B)+X_i(A)]*\sin A+[X_r(B)-X_r(A)]*\cos A+X_i(A)-X_i(B)$ wherein A+B=N, R(m) is a real component of an mth point of said first N/2-point complex-valued series, i(m) is an imaginary component of said mth point; $X_r(p)$ is a real component of a pth point of said N-point complex-valued series, and $X_i(p)$ is an imaginary component of said pth point.

20. A computer program product for receiving an OFDM signal, said computer program product comprising:

code converts a series of N real-valued time domain samples of a received OFDM signal to a frequency domain OFDM symbol using an N/2-point transformer, the code that converts including code for mapping the series of N real-valued time domain samples to a first N/2-point series of values using a first mapping function;

transforming the first N/2-point series of values using the N/2-point transformer to perform an FFT on said first N/2-point series of values to obtain a second N/2-point series of values; and mapping the second N/2-point series of values to a total of N real and imaginary valued subcarriers at a corresponding set of N frequency subchannels using a second mapping function;

code that selects subcarriers from said frequency domain OFDM symbol to effect a frequency shift from an intermediate frequency (IF) to baseband; and a computer-readable storage medium that stores the code that converts and the code that selects.

* * * * *

UNITED STATES PATENT AND TRADEMARK OFFICE
CERTIFICATE OF CORRECTION

| | |
|---|---|
| PATENT NO. | : 7,072,411 B1 |
| APPLICATION NO. | : 10/004567 |
| DATED | : July 4, 2006 |
| INVENTOR(S) | : Dollard |

It is certified that error appears in the above-identified patent and that said Letters Patent is hereby corrected as shown below:

On the Title Page, Item (57)
In line 3 of the abstract, kindly change "(FET)" to --(FFT)--.

In column 1, line 17, kindly change "does not operately" to --does not operate--.

In column 1, line 28, kindly change "of rewriting" to --of rewiring--.

In column 1, line 33, kindly change "business" to --businesses--.

In column 1, line 34, kindly change "business" to --businesses--.

In column 3, line 55, kindly change "invention herein" to --inventions herein--.

In column 3, line 64, kindly change "signal spectrum" to --signal spectrums--.

In column 4, line 60, kindly change "frequency domain as" to --frequency domain at--.

In column 4, line 62, kindly change "side spectrum" to --wide spectrum--.

In column 5, line 15, kindly change "knowledge than" to --knowledge that--.

In column 5, line 20, kindly change "used instead on" to --used instead of--.

In column 6, line 13, kindly change "centered amount" to --centered around--.

In column 6, line 20, kindly change "time sample" to --time samples--.

In column 6, line 21, kindly change "signal is then sampled" to --signal is sampled--.

In column 6, line 33, kindly change "transmission" to --transmitter--.

In column 6, line 43, kindly change "centered and around" to --centered around--.

In column 6, line 48, kindly change "prefix removed" to --prefix removal--.

In column 6, line 53, kindly change "output will" to --outputs will--.

In column 7, line 1, kindly change "128-pound" to --128-point--.

UNITED STATES PATENT AND TRADEMARK OFFICE
CERTIFICATE OF CORRECTION

PATENT NO. : 7,072,411 B1
APPLICATION NO. : 10/004567
DATED : July 4, 2006
INVENTOR(S) : Dollard Page 2 of 3

It is certified that error appears in the above-identified patent and that said Letters Patent is hereby corrected as shown below:

In column 7, kindly change the formula starting after line 9, from
"
$$X_r(n) = \left[\frac{R(n)}{2} + \frac{R(N-n)}{2}\right] + \cos\left(\frac{\pi n}{N}\right)\left[\frac{I(n)}{2} + \frac{I(N-n)}{2}\right] - \sin\left(\frac{\pi n}{N}\right)\left[\frac{R(n)}{2} - \frac{R(N-n)}{2}\right]$$

$$X_i(n) = \left[\frac{I(n)}{2} + \frac{R(N-n)}{2}\right] - \sin\left(\frac{\pi n}{N}\right)\left[\frac{I(n)}{2} + \frac{I(N-n)}{2}\right] - \cos\left(\frac{\pi n}{N}\right)\left[\frac{R(n)}{2} - \frac{R(N-n)}{2}\right]$$

$$n = 0,1,\ldots,N-1$$
"
to
--
$$X_r(n) = \left[\frac{R(n)}{2} + \frac{R(N-n)}{2}\right] + \cos\left(\frac{\pi n}{N}\right)\left[\frac{I(n)}{2} + \frac{I(N-n)}{2}\right] - \sin\left(\frac{\pi n}{N}\right)\left[\frac{R(n)}{2} - \frac{R(N-n)}{2}\right]$$

$$X_i(n) = \left[\frac{I(n)}{2} - \frac{R(N-n)}{2}\right] - \sin\left(\frac{\pi n}{N}\right)\left[\frac{I(n)}{2} + \frac{I(N-n)}{2}\right] - \cos\left(\frac{\pi n}{N}\right)\left[\frac{R(n)}{2} - \frac{R(N-n)}{2}\right]$$

$$n = 0,1,\ldots,N-1$$
--.

In column 7, line 26, kindly change "conjugate to the" to --conjugate of the--.

In column 7, line 32, kindly change "block 214 and 128" to --block 214 are 128--.

In column 7, line 33, kindly change "or an oversampled" to --of an oversampled--.

In column 7, line 41, kindly change "setting the group" to --selecting the group--.

In column 7, line 50, kindly change "digital signal process" to --digital signal processor--.

In column 8, line 32, kindly change "is outline" to --is outlined--.

In column 8, line 66, kindly change "2560+320+512+3392" to --2560+320+512=3392--.

In column 9, line 2, kindly change "signal an IF" to --signal at IF--.

In column 9, line 8, kindly change "40*80=320" to --4*80=320--.

In column 9, line 15, kindly change "52*=208" to --52*4=208--.

UNITED STATES PATENT AND TRADEMARK OFFICE
CERTIFICATE OF CORRECTION

PATENT NO. : 7,072,411 B1
APPLICATION NO. : 10/004567
DATED : July 4, 2006
INVENTOR(S) : Dollard It is certified that error appears in the above-identified patent and that said Letters Patent is hereby corrected as shown below:

In column 10, line 18, kindly change "complex values" to --complex valued--.

In column 10, line 22, kindly change "centered to an intermediate frequency (IF) as a baseband" --centered at an intermediate frequency (IF) as baseband--.

In column 10, line 30, kindly change "at values" to --of values--.

In column 10, line 50, kindly change "subchannels on" to --subchannels of--.

In column 10, line 54, kindly change "valued using" to --valued series using--.

In column 11, line 35, kindly change "$x(2k)= y_r(k), x(2k+1)= y_r(k)$" to --$x(2k)= y_r(k), x(2k+1)= y_i(k)$--.

In column 11, line 37, kindly change "complete point" to --complex point--.

In column 14, line 10, kindly change "code converts" to --code that converts--.

In column 14, line 13, kindly change "including code for" to --including code for:--.

Signed and Sealed this

Seventh Day of November, 2006

JON W. DUDAS
*Director of the United States Patent and Trademark Office*